US012623183B2

(12) United States Patent
Gallucci et al.

(10) Patent No.: US 12,623,183 B2
(45) Date of Patent: May 12, 2026

(54) COUPLING DEVICE AND COMBINATION AND ASSEMBLY THEREOF WITH A TUBE

(71) Applicant: TECHNISCHE UNIVERSITEIT EINDHOVEN, Eindhoven (NL)

(72) Inventors: Fausto Gallucci, Eindhoven (NL); Madan Bindraban, Eindhoven (NL)

(73) Assignee: TECHNISCHE UNIVERSITEIT EINDHOVEN, Eindhoven (NL)

( * ) Notice: Subject to any disclaimer, the term of this patent is extended or adjusted under 35 U.S.C. 154(b) by 389 days.

(21) Appl. No.: 18/022,919

(22) PCT Filed: Aug. 31, 2021

(86) PCT No.: PCT/NL2021/050529
§ 371 (c)(1),
(2) Date: Feb. 23, 2023

(87) PCT Pub. No.: WO2022/050837
PCT Pub. Date: Mar. 10, 2022

(65) Prior Publication Data
US 2023/0321593 A1      Oct. 12, 2023

(30) Foreign Application Priority Data

Sep. 1, 2020    (NL) ...................................... 2026391

(51) Int. Cl.
B01D 53/22          (2006.01)
B01D 71/02          (2006.01)
F16L 19/10          (2006.01)

(52) U.S. Cl.
CPC ..... B01D 53/228 (2013.01); B01D 71/02231 (2022.08); F16L 19/103 (2013.01); *B01D 2256/16* (2013.01)

(58) Field of Classification Search
CPC ............ B01D 53/228; B01D 71/02231; B01D 2256/16; F16L 19/103
See application file for complete search history.

(56) References Cited

U.S. PATENT DOCUMENTS 2,456,819 A * 12/1948 Dobbs ..................... E21B 7/021
                                                        173/44
3,250,550 A * 5/1966 Lyon ..................... F16L 19/103
                                                        285/382.7

(Continued)

FOREIGN PATENT DOCUMENTS

CN        210954013 U     7/2020
JP        2012007727 A    1/2012

OTHER PUBLICATIONS

International Search Report & Written Opinion, International Patent Application No. PCT/NL2021/050529, mailed Feb. 9, 2022, 8 pages.

*Primary Examiner* — Anthony Shumate
(74) *Attorney, Agent, or Firm* — CasimirJones, S.C.; Brian F. Bradley

(57) ABSTRACT

The invention relates to a coupling device for a tube having a Palladium-based membrane deposited thereon, for use in separation and purification of hydrogen in a hydrogen separator or reactor. The coupling device has an inlet for gas and configured to couple said tube to the inlet; a body part with a cylindrical opening for receiving the tube and for receiving gas flow to the inlet; a nut, the body part and the nut being configured such that the nut can be screwed onto the body part at the opening; a stack of at least two sealing rings. The body part, the nut and sealing rings are configured such that the tube extends through an axial end portion of the nut, the sealing rings into the opening such that, in use, the sealing (Continued)

rings are compressed axially as a result of screwing the nut onto the body part so that the sealing rings sealingly engage the tube.

17 Claims, 6 Drawing Sheets

(56) References Cited

U.S. PATENT DOCUMENTS

| | | | | |
|---|---|---|---|---|
| 3,437,357 | A | | 4/1969 | Rubin |
| 3,695,647 | A | * | 10/1972 | Pugliese ............... F16L 19/103 |
| | | | | 285/341 |
| 7,806,443 | B1 | * | 10/2010 | Plattner ................. F16L 19/106 |
| | | | | 285/332.1 |
| 2004/0060437 | A1 | * | 4/2004 | Frost ............... B01D 71/02232 |
| | | | | 95/56 |
| 2005/0072304 | A1 | * | 4/2005 | Etievant .................. C01B 3/342 |
| | | | | 96/11 |
| 2006/0090651 | A1 | * | 5/2006 | Liu .................. B01D 71/02231 |
| | | | | 210/500.25 |
| 2018/0058047 | A1 | * | 3/2018 | Kennedy ................... E03B 9/04 |
| 2018/0058613 | A1 | * | 3/2018 | Kennedy ................... B05B 1/00 |
| 2020/0156000 | A1 | * | 5/2020 | Mukai ................. B01D 53/228 |
| 2021/0291117 | A1 | * | 9/2021 | Granlund .............. B01D 69/02 |
| 2022/0034169 | A1 | * | 2/2022 | Ariton .................. F16L 19/103 |
| 2023/0158459 | A1 | * | 5/2023 | Berlinguette .......... C25B 13/05 |
| | | | | 422/211 |

* cited by examiner

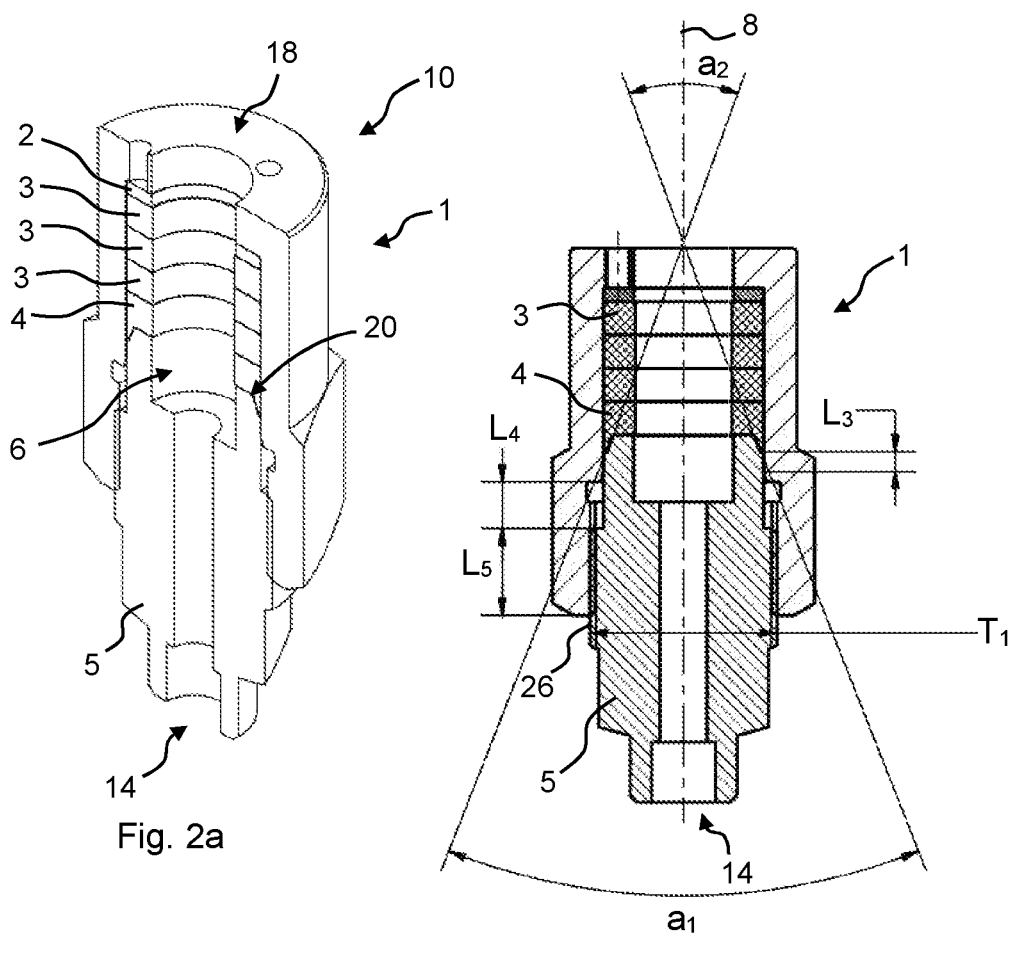
Fig. 2a
Fig. 2b
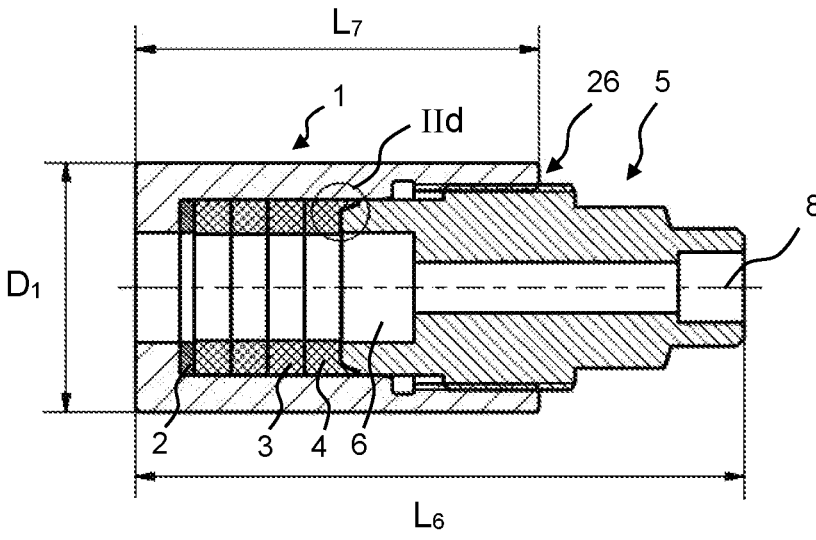
Fig. 2c

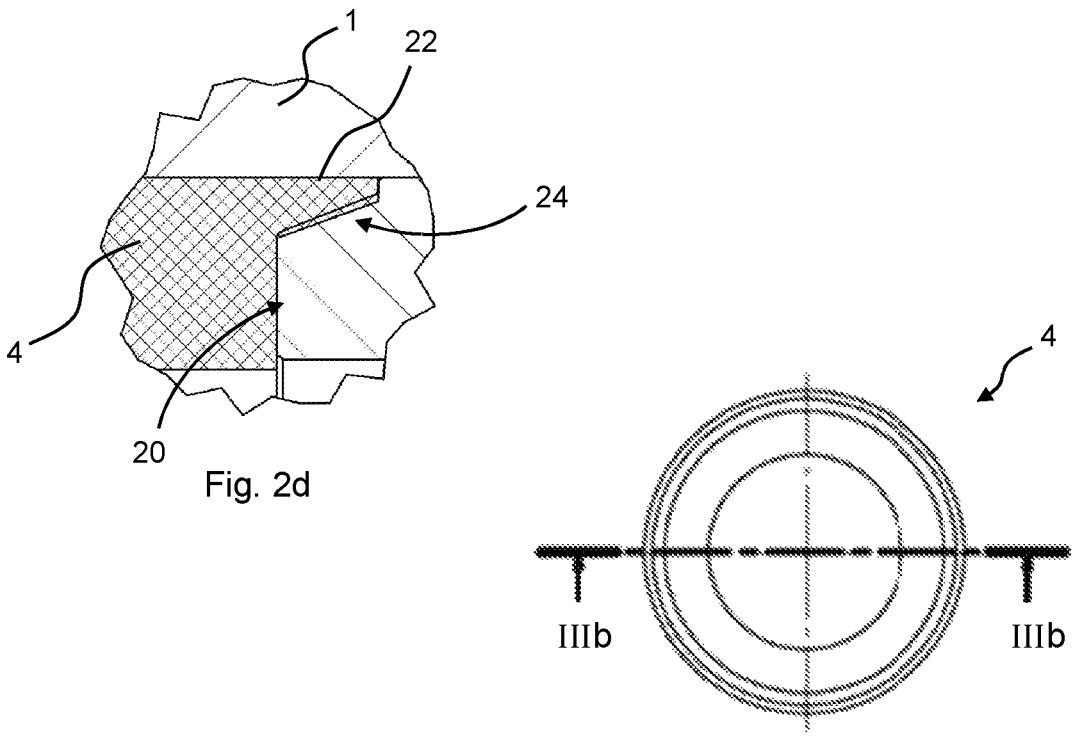
Fig. 2d
Fig. 3a
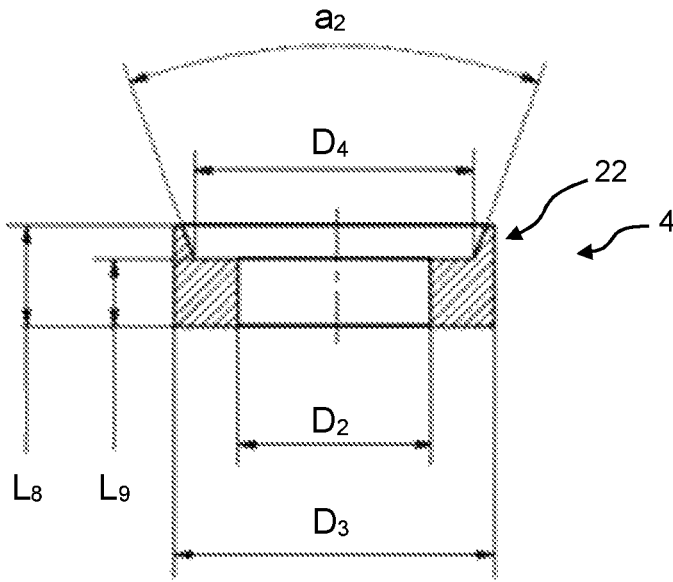
Fig. 3b

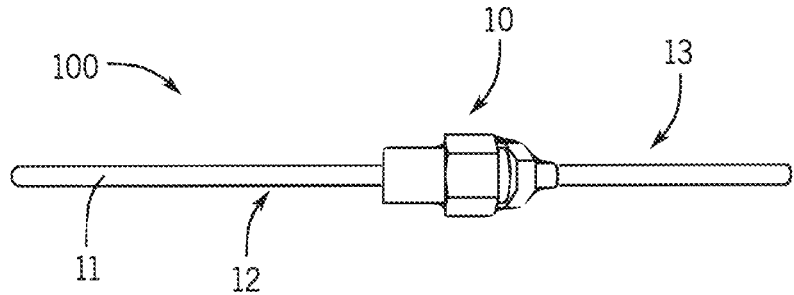
FIG. 4
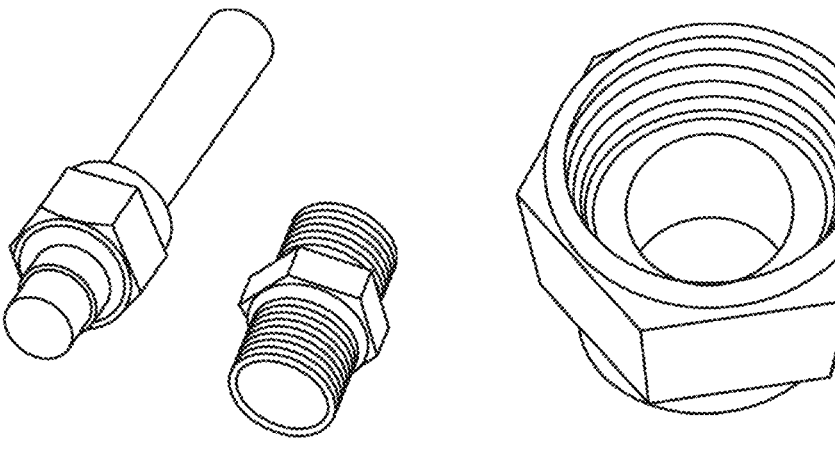
FIG. 5a                    FIG. 5b

COUPLING DEVICE AND COMBINATION AND ASSEMBLY THEREOF WITH A TUBE

The present invention relates to a coupling device for a tube having a Palladium-based membrane deposited thereon, the tube for use in separation and purification of hydrogen in a hydrogen separator or reactor. The invention further relates to a combination and to an assembly of such a coupling device and such a tube.

Sealing of Pd-based (Palladium-based) membrane layers deposited on ceramic tubular supports represents a challenging task: preliminary tests showed gas leak problems after some thermal cycles, due to the detachment of the Pd membrane layer that is deposited on the glass used to connect the ceramic dense and porous parts. This leakage would decrease the separation efficiency of the membranes and thus the quality of the hydrogen produced. Solving this problem will make the membranes closer to industrial applications.

Chen et al. (Chen W, Hu X, Wang R, Huang Y. On the assembling of Pd/ceramic composite membranes for hydrogen separation. Sep Purif Technol Mar 2010; 72(1):92e7) described a method using graphite ferrules instead of using standard metal ferrules. The authors have shown that these graphite ferrules could successfully seal the membrane with Swagelok® connectors. Even at very high pressures up to 50 bar, the nitrogen leakage rate over the connectors was only about 0.35 ml/min. To seal the membranes with Swagelok® fittings of 10 mml·D. (code: SS-10M0-6), graphite ferrules of 10 mm I.D. (purchased from CHROMalytic TECH(nology) Pty Ltd) were used instead of the standard metal ones. Ferrules were opened from inside with a rotating cutter with sharp edges to in-crease the inner diameter of the ferrules in order to make them fit to the membranes (with an O.D. between 10 and 10.4 mm). Before sealing the membrane with the opened ferrules, the ferrules were first conditioned in the Swagelok® fitting with a dummy Stainless steel (316L) rod to form the ferrules to the right shape. The diameter of the dummy is equal to the diameter of the membrane to be sealed. The connectors were tightened with about 20-30 Nm (torque wrench) to form them with the right shape and to get a smooth inner surface. Reference is made in this regard to Fernandez et al. (Ekain Fernandez, Arash Helmi, Kai Coenen, Jon Melendez, Jose Luis Viviente, David Alfredo Pacheco Tanaka, Martin van Sint Annaland, Fausto Gallucci, Development of thin Pd—Ag supported membranes for fluidized bed membrane reactors including WGS related gases, International Journal of Hydrogen Energy, Volume 40, Issue 8, 2015, Pages 3506-3519). See FIGS. 5a and 5b, in which FIG. 5a shows a 316L dummy rod with graphite ferrule and FIG. 5b shows a connector with pre-treated ferrule (shiny inner surface), also with reference to Fernandez et al.

FIG. 6a shows a Pd membrane (E80 e PdeAg membrane, thickness 4.5 micron) before connecting to the Swagelok® connectors, while FIG. 6b shows the same membrane after connecting to the Swagelok® connectors. Again reference is made to Fernandez et al.

Although the sealing is effective in making the membrane more gas tight compared to previous cases, it is still a point of attention as most of the leakages are still coming from that zone. An extensive study on the stability of the membrane and sealing has been carried out showing that the membrane with 2 sealings has double the leakages than the one with 1 sealing. And the membrane where the sealing can be applied with higher torque, has less leakages that the one where the torque applied is less (see FIG. 7, showing relative nitrogen permeance of the membranes 1a to 3 in the long-term membrane test. Reference is made to De Nooijer et al. (de Nooijer, N., Plazaola, A. A., Rey, J. M., Fernandez, E., Tanaka, D. A. P., Annaland, M. S., Gallucci, F. Long-term stability of thin-film Pd-based supported membranes (2019) Processes, 7 (2), art. no. 106).

It is an object to develop a sealing method that decreases the leakages and is more stable and possibly reusable. It is an object to provide an improved coupling device and an improved combination and assembly of such a coupling device and a tube having a Palladium-based membrane deposited thereon. It is an object to provide a coupling device, combination and assembly of such a coupling device and a tube having a Palladium-based membrane deposited thereon, having an improved sealing.

According to the present invention, a coupling device is provided as defined in claim 1. Embodiments of the coupling device are defined in the dependent claims.

The invention also relates to a combination as defined in claim 9 and an assembly as defined in claim 11. Embodiments of the coupling device as defined below are also applicable to the combination and the assembly.

As defined in claim 1, the invention provides a coupling device for a tube having a Palladium-based membrane deposited thereon, the tube for use in separation and purification of hydrogen in a hydrogen separator or reactor. The coupling device has an inlet for a gas and configured to couple said tube to the inlet so that the gas can be supplied via the inlet into the tube.

The coupling device comprises a body part with a cylindrical opening for receiving the tube, the opening being arranged to receive gas flow to the inlet. The coupling device also comprises a nut, wherein the body part and the nut being configured such that the nut can be screwed onto the body part at the opening. The coupling device further has a stack of at least two sealing rings provided between an end portion of the body part surrounding the opening and an axial end portion of the nut. The nut preferably radially encloses the stack of sealing rings on an outer side, i.e. outer circumference, thereof.

The body part, the nut and the stack of sealing rings are configured such that the tube extends through the axial end portion of the nut, through the stack of sealing rings and into the opening such that, in use, the stack of sealing rings is compressed in an axial direction of the stack as a result of screwing the nut onto the body part so that the sealing rings sealingly engage a circumferential surface of the tube.

The invention provides a sealing, i.e. a coupling device, for membranes that allows more area of contact between membrane and the sealing rings, such as graphite gaskets, and can use standard graphite rings. It allows operation with lower possibility of leakages and can be reused.

The inventors have found out that graphite ferrules are not good enough for ultra high hydrogen purity. The reason is the relatively small contact area between the membrane and the ferrule, as well as the small thickness of the ferrule. A new sealing has been developed that instead of using graphite ferrules uses a stack of sealing rings, such as a number of graphite rings, such that the area of contact with the membrane is increased. Additionally the pressure on the membrane is generated via an axial compression of the sealing rings which leads to a radial inward expansion of the sealing rings, thereby sealingly engaging the tube. So a higher torque can be applied and a better sealing can be achieved.

Preferably, the stack of sealing rings is a stack of two to eight sealing rings, preferably three to five sealing rings, preferably four sealing rings. A total axial length of the stack of sealing rings is preferably in the range of 1 to 2 times the outer diameter of the tube.

The material of construction (body part and nut) may be stainless steel, which is effective in particular for temperatures below 500 degrees C. The material of the body part and nut may be a low carbon alloy, which is effective in particular for higher temperatures. In an embodiment, treads on the body part and on the nut) may be coated with silver or ceramic to be able to open easily and reuse the sealing. For temperatures above 550 degrees C. the graphite rings may be replaced by mica rings with the same shapes. In another embodiment, the sealing rings are copper rings.

In an embodiment, sealing rings of the stack are square or rectangular shaped O-rings.

Additionally, the last sealing ring, preferably a graphite ring, may have a shape such that possible leaking is minimized, which may be achieved by an embodiment wherein a sealing ring of the stack of sealing rings, which sealing ring in use contacts the end portion of the body part surrounding the opening, is a square or rectangular shaped O-ring having an axially protruding tapered ridge, preferably a circumferential ridge, facing the end portion of the body part, wherein the end portion of the body part has a correspondingly tapered or chamfered portion for receiving therein the ridge. In an embodiment, the ridge and the tapered portion are dimensioned such that the ridge exerts a force having a radial component on the tapered portion as a result of axial compression of the sealing ring.

A metal ring may be added at the bottom so that, optionally together with one or more, such as three, small holes in the sealing body, one can easily remove the sealing rings and re-use much easily the sealing. These effects may be achieved by an embodiment further comprising a metal ring on top of the stack of sealing rings, the ring being arranged between the axial end portion of the nut and the stack, so that a compressive force is exerted from the axial end portion of the nut to the stack of sealing rings via the metal ring.

In an embodiment, threads on the nut and/or on the body part have a coating made of silver or graphite, the threads arranged to screw the nut on the body part.

The invention also relates to a combination, as defined in claim 9, of a coupling device according to the present invention, and a tube having a Palladium-based membrane deposited thereon, for use in separation and purification of hydrogen in a hydrogen separator or reactor. In an embodiment, the tube is porous, preferably made of a ceramic material.

The invention also relates to an assembly comprising a coupling device according to the present invention, and a tube having a Palladium-based membrane deposited thereon, for use in separation and purification of hydrogen in a hydrogen reactor, wherein the tube extends through the axial end portion of the nut, through the stack of sealing rings and into the opening, wherein the stack of sealing rings is compressed in an axial direction of the stack as a result the nut being screwed onto the body part so that the sealing rings sealingly engage a circumferential surface of the tube.

In an embodiment of the assembly, the tube is porous, preferably made of a ceramic material.

Embodiments of the coupling device according to the invention are also applicable to the combination and to the assembly according to the invention. Effects of the coupling device and embodiments thereof are applicable to the combination and assembly in an analogous manner.

The present invention is described hereinafter with reference to the accompanying schematic drawings in which an embodiment of the present invention are shown and in which like reference numbers indicate the same or similar elements.

FIG. 1a shows, in 3-dimensional view, an example of a coupling device according to the present invention;

FIG. 1b shows, in 3-dimensional exploded view, individual components of the coupling device of FIG. 1a;

FIG. 1c shows a bottom view of the coupling device of FIG. 1a;

FIG. 2a shows section A-A of FIG. 1c, in 3-dimensional view;

FIG. 2b shows cross-section A-A of FIG. 1c;

FIG. 2c shows cross-section B-B of FIG. 1c;

FIG. 2d shows detail IId of FIG. 2c;

FIG. 3a shows, in plan view, a top ring of the coupling device of FIG. 1a;

FIG. 3b shows section IIIb-IIIb of FIG. 3a;

FIG. 4 shows, in front view, an example of an assembly according to the present invention, connected to an external tube;

FIGS. 5a and 5b show components of a prior art coupling;

Figures 1A, 1B, 1C:
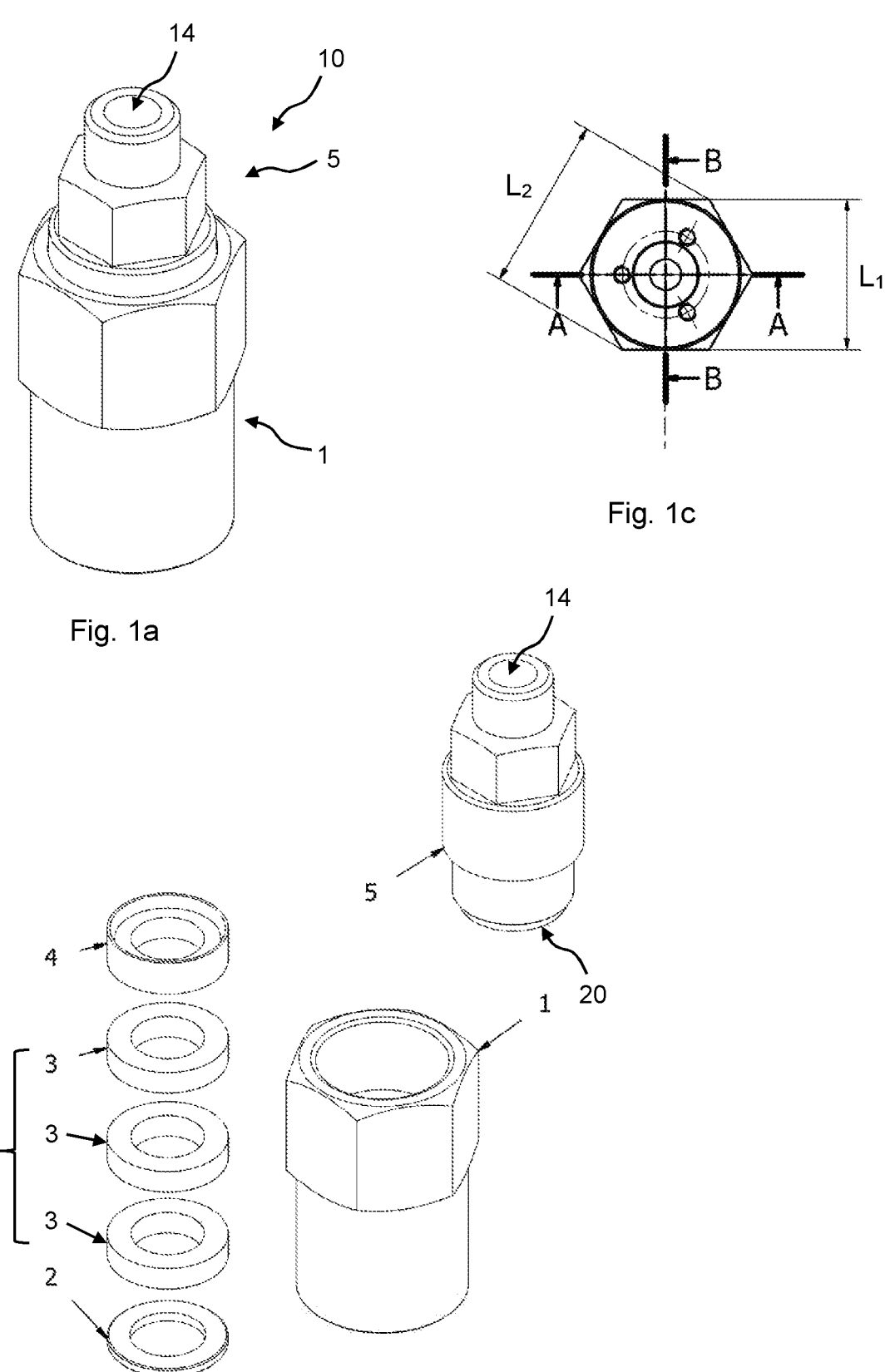
Figure 6A:
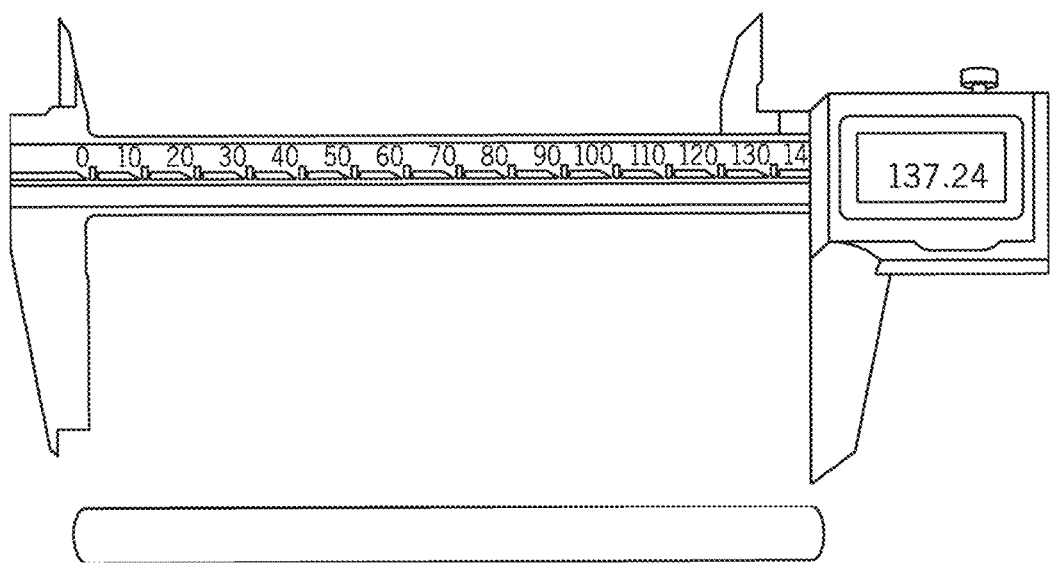
FIGS. 6a and 6b show components of a prior art coupling and membrane.
Figure 6B:
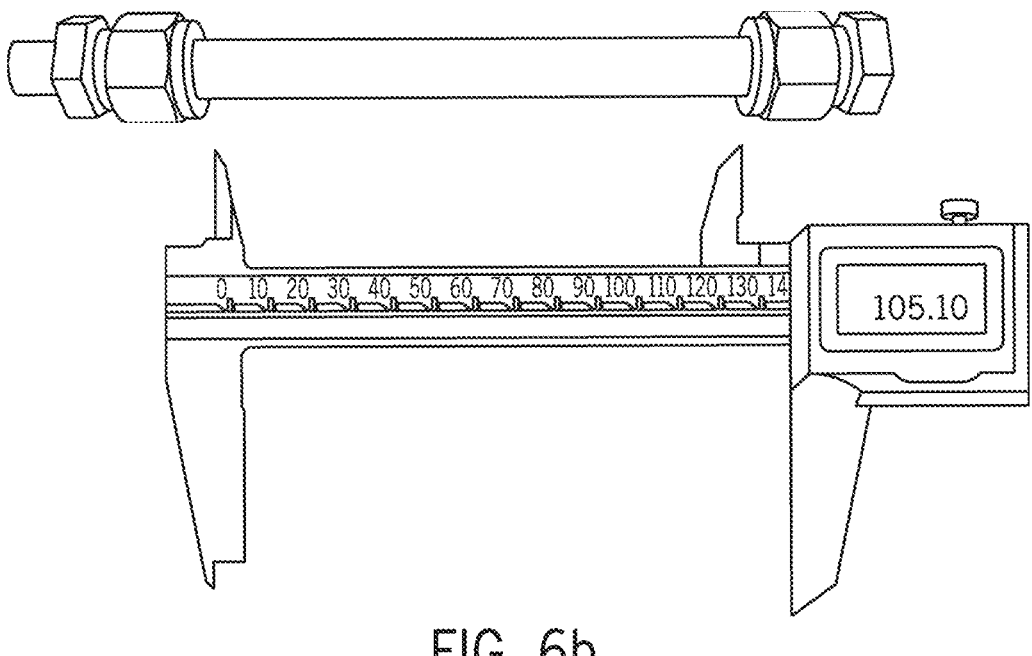
Figure 7:
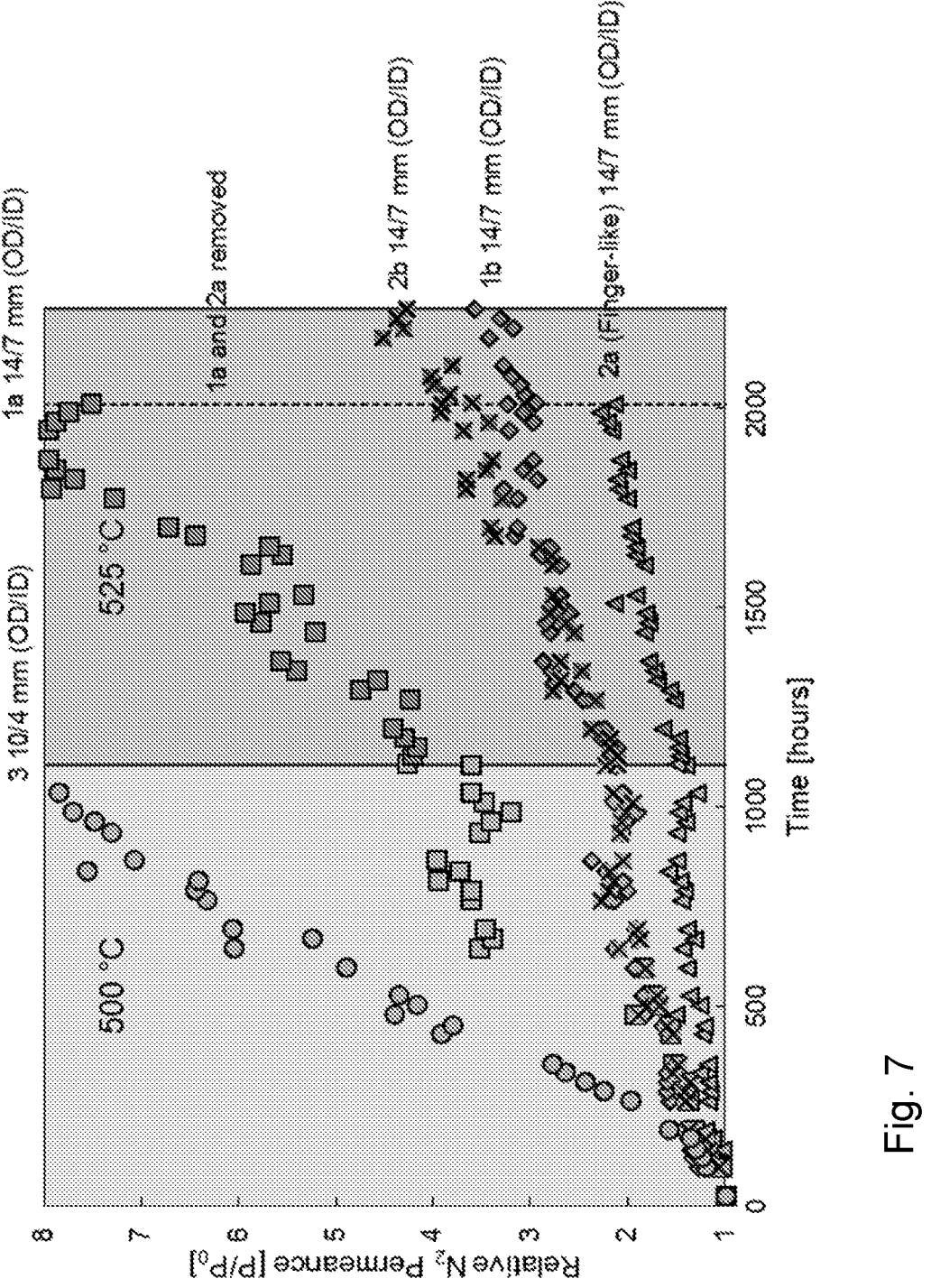
FIG. 7 shows a graph of tests of a prior art coupling and membranes.

The dimensions of the sealing, that means of the coupling device, depend on the membrane, that means of the tube having the membrane deposited thereon. FIGS. 1a-3b show an example of a coupling device 10 according to the invention, for 14 mm membranes. The same shape can be used from membranes of different size starting from 6 mm diameter. In embodiments, the coupling device is for use with tubes having an outer diameter in the range of 5 to 50 mm.

FIGS. 1a-3b show a coupling device 10 for a tube 12 having a Palladium-based membrane deposited thereon. The tube 12 is for use in separation and purification of hydrogen in a hydrogen separator or reactor. The tube 12 is porous and preferably made of a ceramic material. The coupling device 10 has an inlet 14 for a gas and configured to couple said tube 12 to the inlet 14 so that the gas can be supplied via the inlet 14 into the tube 14. The supply of gas towards the inlet 14 may take place via an external tube 13 which is connected to the inlet 14 of the coupling device 10, as FIG. 4 shows.

The coupling device 10 comprises a body part 5 with a cylindrical opening 6 for receiving the tube 12. The opening 6 is arranged to receive gas flow to the inlet 14. The coupling device 10 also comprises a nut 1, wherein the body part 5 and the nut 1 are configured such that the nut 1 can be screwed onto the body part 5 at the opening 6. The body part 5 and the nut 1 are made of a stainless steel or a low carbon alloy. The material of the nut 1 and of the body part 5 may be Inconel 625. Threads 26 on the nut 1 and on the body part 5 may have a coating made of silver or graphite, the threads 26 arranged to screw the nut on the body part.

The coupling device 10 further has a stack 16 of at least two sealing rings 3, 4, in the example shown in the figures a number of three sealing rings 3 and one sealing ring 4, the stack 16 being provided between an end portion 20 of the body part 5 surrounding the opening 6 and an axial end portion 18 of the nut 1. The stack may have two to eight sealing rings, preferably three to five sealing rings, preferably four sealing rings as is the case in the example shown in the figures. The sealing rings 3, 4 are made of graphite but may also be made of mica or copper. The sealing rings 3, 4 of the stack 16 are rectangular, about square shaped, O-rings.

The body part 5, the nut 1 and the stack 16 of sealing rings 3, 4 are configured such that the tube extends through the axial end portion 18 of the nut, through the stack 16 of sealing rings and into the opening 6 such that, in use, the stack 16 of sealing rings 3, 4 is compressed in an axial direction 8 of the stack 16 as a result of screwing the nut 1 onto the body part 5 so that the sealing rings 3, 4 sealingly engage a circumferential surface 11 of the tube 12.

At least in the example shown, the coupling device 10 further comprises an optional metal ring 2 on top of the stack 16 of sealing rings 3, 4. The material of the ring 2 may be stainless steel. The ring 2 is arranged between the axial end portion 18 of the nut 1 and the stack 16, so that a compressive force is exerted from the axial end portion 18 of the nut 1 to the stack 16 of sealing rings 3, 4 via the metal ring 2. Also, the sealing ring 4 of the stack 16 of sealing rings 3, 4, which sealing ring 4 in use contacts the end portion 20 of the body part 5 surrounding the opening 6, is a rectangular shaped O-ring having an axially protruding tapered ridge 22, which is a circumferential ridge as in particular FIG. 3b shows, facing the end portion 20 of the body part 5. The end portion 20 of the body part 5 has a correspondingly tapered or chamfered portion 24 for receiving therein the ridge 22. See FIG. 2d. The ridge 22 and the tapered portion 24 are dimensioned such that the ridge exerts a force having a radial component on the tapered portion as a result of axial compression of the sealing ring 4.

In the example shown in the figures, the following dimensions may be chosen for use of the coupling device with a tube having an outer diameter of 14 mm, that means with a membrane of 14 mm. The specific dimensions are merely provided as an example. Other dimensions may be suitably chosen dependent on the size of the membrane and/or intended application. L1 may be a size 34 hex nut (L2 may in that case be 39.26 mm); L3 may be 3 mm; L4 may be 7 mm; L5 may be 13 mm; L6 may be 83 mm; L7 may be 55 mm; L8 may be 7.5 mm (or between 7.3 and 7.7 mm); L9 may be 5 mm (or between 4.8 and 5.2 mm); T1 may be a 28×1.5 thread (outer thread on the body part and corresponding inner thread on the nut); D1 may be 34 mm; D2, being the inner diameter of ring 4, may be 14.5 mm (or between 14.5 and 14.7 mm); D3, being the outer diameter of ring 4, may be 24 mm (or between 23.8 and 24 mm); diameter D4 may be 21 mm (or between 20.8 and 21 mm); angle a1 may be 43 degrees; angle a2 may be 40 degrees (or between 39.5 and 40.5 degrees). Each of the rings 3 may have an inner diameter of 14.5 mm (or between 14.5 and 14.7 mm), an outer diameter of 24 mm (or between 23.8 and 24 mm) and a thickness of 5 mm (or between 4.8 and 5.2 mm).

FIG. 4 shows an assembly 100 comprising the coupling device 10 and the tube 12 having a Palladium-based membrane deposited thereon, for use in separation and purification of hydrogen in a hydrogen reactor. The tube extends through the axial end portion of the nut, through the stack of sealing rings and into the opening, wherein the stack of sealing rings is compressed in an axial direction of the stack as a result the nut being screwed onto the body part so that the sealing rings sealingly engage a circumferential surface of the tube. The top part of the sealing, i.e. the coupling device (at the inlet) may be welded to an external tube 13 of any dimension for easy installation inside the reactor. A potential commercial use of the invention is membrane sealing for membrane separation and membrane reactors.

Other variations to the disclosed embodiments can be understood and effected by those skilled in the art in practicing the claimed invention, from a study of the drawings, the disclosure, and the appended claims. The foregoing description provides embodiments of the invention by way of example only. The scope of the present invention is defined by the appended claims. One or more of the objects of the invention are achieved by the appended claims.

The invention claimed is:

1. A coupling device (10) for a tube (12) having a Palladium-based membrane deposited thereon, the tube for use in separation and purification of hydrogen in a hydrogen separator or reactor, the coupling device having an inlet (14) for a gas and configured to couple said tube to the inlet so that the gas can be supplied via the inlet into the tube, the coupling device comprising:

a body part (5) with a cylindrical opening (6) for receiving the tube, the opening being arranged to receive gas flow to the inlet; and a nut (1), wherein the body part and the nut being configured such that the nut can be screwed onto the body part at the opening;

the coupling device further having a stack (16) of at least two sealing rings (3, 4) provided between an end portion (20) of the body part surrounding the opening and an axial end portion (18) of the nut, wherein the body part, the nut and the stack of sealing rings are configured such that the tube extends through the axial end portion of the nut, through the stack of sealing rings and into the opening such that, in use, the stack of sealing rings is compressed in an axial direction (8) of the stack as a result of screwing the nut onto the body part so that the sealing rings sealingly engage a circumferential surface (11) of the tube; and wherein a sealing ring (4) of the stack (16) of sealing rings (3, 4), which sealing ring (4) in use contacts the end portion (20) of the body part (5) surrounding the opening (6), is a square or rectangular shaped O-ring having an axially protruding tapered ridge (22) facing the end portion (20) of the body part, wherein the end portion of the body part has a correspondingly tapered or chamfered portion (24) for receiving therein the ridge (22).

2. Coupling device according to claim 1, wherein the stack (16) of sealing rings (3, 4) is a stack of two to eight sealing rings.

3. Coupling device according to claim 1, wherein the sealing rings (3, 4) are made of graphite, mica or copper.

4. Coupling device according to claim 1, wherein sealing rings (3, 4) of the stack (16) are square or rectangular shaped O-rings.

5. Coupling device according to claim 1, further comprising a metal ring (2) on top of the stack of sealing rings (3, 4), the metal ring (2) being arranged between the axial end portion (18) of the nut and the stack (16), so that a compressive force is exerted from the axial end portion of the nut to the stack of sealing rings via the metal ring.

6. Coupling device according to claim 1, wherein the body part (5) and/or the nut (1) are made of a stainless steel or a low carbon alloy.

7. Coupling device according to claim 1, wherein a plurality of threads (26) on the nut (1) and/or on the body part (5) have a coating made of silver or graphite, the plurality of threads arranged to screw the nut on the body part.

8. Combination of the coupling device (10) according to claim 1, and the tube (12) having the Palladium-based membrane deposited thereon, for use in separation and purification of hydrogen in the hydrogen separator or reactor.

9. The combination of claim 8, wherein the tube (12) is porous.

10. An assembly (100) comprising the coupling device (10) according claim 1, and the tube (12) having the Palladium-based membrane deposited thereon, for use in separation and purification of hydrogen in the hydrogen separator or reactor, wherein the tube extends through the axial end portion of the nut, through the stack of sealing rings and into the opening, wherein the stack of sealing rings is compressed in an axial direction of the stack as a result the nut being screwed onto the body part so that the sealing rings sealingly engage a circumferential surface of the tube.

11. The assembly (100) of claim 10, wherein the tube (12) is porous.

12. The assembly (100) of claim 11, wherein the tube (12) is made of a ceramic material.

13. The combination of claim 9, wherein the tube (12) is made of a ceramic material.

14. Coupling device according to claim 2, wherein the stack (16) of sealing rings (3, 4) is a stack of three to five sealing rings.

15. Coupling device according to claim 14, wherein the stack (16) of sealing rings (3, 4) is a stack of four sealing rings.

16. Coupling device according to claim 1, wherein the axially protruding tapered ridge (22) is a circumferential ridge.

17. Coupling device according to claim 1, wherein the ridge and the tapered portion are dimensioned such that the ridge exerts a force having a radial component on the tapered portion as a result of axial compression of the sealing ring (4).

* * * * *